Patented Aug. 28, 1945

2,383,711

UNITED STATES PATENT OFFICE 2,383,711

PREPARATION OF ALKENALS AND ALKENONES

Alfred Clark and Richard S. Shutt, Columbus, Ohio, assignors to Battelle Memorial Institute, Columbus, Ohio, a corporation of Ohio No Drawing. Application January 26, 1942, Serial No. 428,256

29 Claims. (Cl. 260—597)

Our invention relates to preparation of alkenals and alkenones. It has to do, more specifically, with the direct catalytic oxidation of olefines to unsaturated aldehydes or ketones.

Many attempts have been made to produce unsaturated aldehydes such as acrolein by the dehydration of glycerol, and by catalytic dehydrogenation or catalytic oxidation of unsaturated alcohols, such as allyl alcohol. Attempts have also been made to produce unsaturated ketones, such as methyl vinyl ketone, by dehydration of the condensation product of formaldehyde and acetone and by hydration of vinyl acetylene. These methods have not proved to be commercially successful because of high production costs.

It has been reported that propylene could be oxidized to acrolein in an aqueous acid mercuric sulfate solution in good yields, if the acidity of the solution is carefully controlled. Since it is necessary to use stoichiometric proportions of the mercuric sulfate in relation to the acrolein produced, there is considerable cost in its handling and reoxidation for further use.

One of the objects of our invention is to provide a commercially practicable method for oxidizing olefinic hydrocarbons directly to the corresponding unsaturated aldehydes or ketones.

Another object of our invention is to provide a method of the type indicated in the preceding paragraph which is of such a nature that excessive oxidation of the olefine to carbon dioxide and water, or other end products, is reduced to a minimum, thereby resulting in correspondingly high yields of unsaturated aldehydes or ketones.

By the method of our invention it has been found possible to oxidize olefinic hydrocarbons directly to the corresponding unsaturated aldehydes or ketones by passing mixtures of the said hydrocarbons and air or gases containing molecular oxygen over metal selenite or tellurite catalysts at elevated temperatures. By proper control, excessive oxidation of the olefine to carbon dioxide and water, or other undesirable end products, may be reduced to a minimum, resulting in correspondingly high yields of unsaturated aldehydes or ketones.

This application is a continuation-in-part of our co-pending application Serial No. 372,604, filed December 31, 1940.

According to our invention a suitable olefinic hydrocarbon, such as propylene or isobutylene, which may be obtained from refinery gases, is mixed with excess air in a ratio which supplies sufficient oxygen for oxidation of the hydrocarbon to the corresponding aldehyde. Styrene may be oxidized to phenyl-glyoxal. Butene-2 may be oxidized to crotonaldehyde. Other olefines may be oxidized directly to the corresponding ketones. For example, while propylene may be oxidized to acrolein and isobutylene to methacrolein, butene-1 is oxidized to methyl vinyl ketone. Pentene-1 may be oxidized to ethyl vinyl ketone. In general, if the carbon atom which is alpha to the double bond in the olefinic hydrocarbon is the end carbon atom of the chain, the hydrocarbon will be oxidized to the corresponding aldehyde. If the carbon atom which is alpha to the double bond in the olefinic hydrocarbon is not the end carbon atom of the chain, the hydrocarbon will be oxidized to the corresponding ketone. Our preferred air/hydrocarbon ratio is 90/10. Various ratios of air to olefine may be used dependent upon the particular olefine to be reacted. Lower air ratios than 90/10 reduce catalyst life and increase the amount of complete oxidation to carbon dioxide and water. Higher air ratios than 98/2 unduly decrease the amount of desired oxidation products formed per pass. The selected mixture is then passed over the catalysts of this invention.

These catalysts are the metal selenites and tellurites, by which terms we include simple metal selenites and tellurites such as those of silver, lead, iron, cobalt, nickel, cadmium, mercury, barium, calcium, sodium and potassium, as well as complex salts such as uranyl tellurite, silver-selenito vanadate, etc. Silver selenite is one of the preferred catalysts. Promoters, such as the metallic oxides, may be used to increase the life of the catalyst. Cupric oxide in a minimum concentration of 3 per cent stabilizes the catalyst to give maximum catalytic activity over longer periods of time. Other promoters which have been used are: cerium dioxide, manganese dioxide, barium peroxide, nickel oxide (from the decomposition of nickelous nitrate), strontium oxide, zinc oxide and silver oxide, and vanadium pentoxide.

The catalyst may be deposited upon any suitable support, such as pumice, silica gel, asbestos or diatomaceous earth. The ratio of catalyst to support may vary over a wide range although 1:1 mixtures have been found to be highly satisfactory.

The catalyst temperature is dependent primarily upon the particular olefine being oxidized. Temperatures above 450° C. usually tend to destroy the catalyst while temperatures below about 175° C. are usually insufficient to carry out the oxidation. Temperatures of 275–450° C.

have been found practical for the oxidation of propylene to acrolein although the preferred range is 270–320° C. In the oxidation of isobutylene to alpha methacrolein, temperature control is even more important. The reaction is started at about 225° C. and, as the reaction proceeds, the temperature must be raised to maintain optimum catalytic activity. This increase in catalyst temperature, as the reaction proceeds, is also desirable in the oxidation of propylene, which was previously described. In all cases, the temperature must be accurately controlled to prevent excessive oxidation to water and carbon dioxide. A convenient method for securing this control is to jacket the catalyst chamber and partially fill the jacket with a liquid boiling at about the desired reaction temperature.

The pressure at which the reaction is carried out is not critical, although pressures above atmospheric may be used, if desired, to increase the rate of reaction. The contact time may vary over a wide range with a lower limit of about three seconds.

The metal selenite catalyst suffers some loss of activity with continued use and may be revivified or regenerated by passing air alone through the heated catalyst chamber at selected time intervals. More rapid revivification may be obtained by using small percentages of nitrogen oxides in the air so used. Continuous regeneration may be carried out by feeding in small amounts of nitrogen oxides along with the olefine and air, thus eliminating the separate regenerative step. The percentage of nitrogen oxides present in the gaseous reaction mixture must be carefully controlled to prevent excessive oxidation of the olefine to carbon dioxide and water. Ozone may be used in varying amounts in a manner similar to the use of the nitrogen oxides.

The aldehydes or ketones produced in this invention may be collected or separated from the off gases by any method known to those skilled in the art, for example, by condensation, absorption in aqueous or organic solvents, or adsorption on activated carbon.

Illustrative examples of catalytic oxidation reactions of this invention are as follows:

1. Propylene to acrolein:

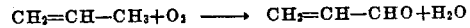

2. Isobutylene to alpha methacrolein:

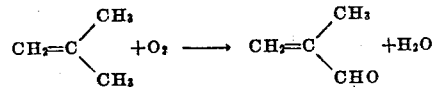

3. Butene-2 to crotonaldehyde:

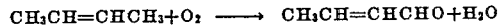

4. Butene-1 to methyl vinyl ketone:

5. Pentene-1 to ethyl vinyl ketone:

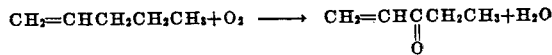

The oxidation of propylene to acrolein is illustrative of the method of this invention. In this oxidation air and propylene were mixed in a ratio of 90/10 and passed at atmospheric pressure over a silver selenite catalyst, promoted with cupric oxide and supported on asbestos at 295° C. The catalyst was prepared as follows: To a thick aqueous slurry comprising 40 parts of silver nitrate, and 40 parts of asbestos was added 13 parts of selenium dioxide in water solution; the product was filtered, washed until neutral and reslurried in water; to this slurry was added 15 parts of fine cupric oxide (prepared by ignition of cupric nitrate); the product was filtered and dried in an oven at 110 to 120° C.; the dried catalyst was disintegrated into a fluffy mass and packed tightly into the catalyst chamber for use. Rates of flow of the gaseous reaction mixture were adjusted to provide a contact time with the catalyst of about seven seconds. Under these conditions approximately 20 per cent of the propylene was converted to acrolein in a single pass. Less than 0.6 per cent propylene was destructively oxidized to carbon dioxide. The acrolein was separated from the off gases by means of activated carbon and the remaining gases were recovered for recycling. The oxidation product was shown to be acrolein and no other aldehydes were detected.

The promoted catalyst maintained its maximum activity for three hours, decreasing to 10 per cent propylene oxidized per pass at the end of 9 hours. At this time the catalyst was regenerated, in situ, by means of air containing small amounts of nitrogen oxides, to its original activity. This regeneration was carried out by merely shutting off the propylene supply and passing air, at a contact time of about 7 seconds, over the catalyst which was held at the reaction temperature for 15 minutes. The air was bubbled through nitric acid made by adding about 10 per cent of fuming nitric acid to the ordinary concentrated nitric acid. Regeneration is shown to be complete when the catalyst regains its white appearance.

A further example of the method of this invention is the oxidation of isobutylene to alpha methacrolein.

This reaction was conducted in the same manner as the above-described oxidation with the following exceptions: An unpromoted silver selenite catalyst was used; the initial catalyst temperature was 230° C. and as the catalytic activity decreased the temperature was gradually raised to 295° C. in order to maintain optimum activity. Under these conditions, approximately 30 per cent of the isobutylene was converted to alpha methacrolein in a single pass. Less than 1.0 per cent isobutylene was destructively oxidized to carbon dioxide. The oxidation product was proved to be alpha methacrolein and no other aldehydes were detected.

The unpromoted catalyst maintained its maximum activity for three hours after which its activity declined to 10 per cent conversion per pass at 3½ hours. The catalyst was then regenerated by means of air alone, to its original activity of approximately 30 per cent of isobutylene converted per pass. Regeneration was carried out by shutting off the isobutylene and allowing air to pass over the catalyst at a contact time of about 7 seconds, at reaction temperature for three hours or more.

It will be apparent from the above description that we have provided an economical and commercially practicable method for oxidizing olefinic hydrocarbons directly to the corresponding unsaturated aldehydes or ketones. It will also be apparent that by our method high yields of unsaturated aldehydes or ketones are obtained.

Various other advantages will be apparent from the preceding description and the following claims.

Having thus described our invention, what we claim is:

1. The process of preparing an organic compound of the group consisting of unsaturated aldehydes and ketones which comprises passing an olefinic hydrocarbon and gases containing molecular oxygen over a catalyst selected from the group consisting of metal selenites and tellurites.

2. The process of preparing an unsaturated aldehyde which comprises passing an olefinic hydrocarbon and oxygen over a catalyst selected from the group consisting of metal selenites and metal tellurites.

3. The process of claim 2 wherein the catalyst is promoted by a metal oxide.

4. The process of preparing an unsaturated aldehyde which comprises passing an olefinic hydrocarbon and gases containing molecular oxygen over a catalyst selected from a group consisting of metal selenites and metal tellurites.

5. The process of claim 4 wherein the catalyst is promoted by a metal oxide.

6. The process of preparing an unsaturated aldehyde which comprises passing an olefinic hydrocarbon and air over a catalyst selected from the group consisting of metal selenites and tellurites.

7. The process of claim 6 wherein the catalyst is promoted by a metal oxide.

8. The process of preparing an unsaturated aldehyde which comprises passing an olefinic hydrocarbon and gases containing molecular oxygen over a silver selenite catalyst.

9. The process of claim 8 wherein the catalyst is promoted by cupric oxide.

10. The process of preparing acrolein which comprises reacting propylene and air in the presence of a silver selenite catalyst.

11. The process of claim 10 wherein the silver selenite catalyst is promoted by copper oxide.

12. The process for preparing alpha methacrolein which comprises reacting isobutylene and air in the presence of a silver selenite catalyst.

13. The process of claim 12 wherein the silver selenite catalyst is promoted by copper oxide.

14. The process of preparing an unsaturated aldehyde which comprises passing an olefinic hydrocarbon and air together with nitrogen oxides over a metal selenite catalyst.

15. The process of preparing an unsaturated aldehyde which comprises mixing an olefinic hydrocarbon with excess air in a ratio of from 90/10 to 98/2 and passing the mixture over a catalyst selected from the group consisting of metal selenites and metal tellurites.

16. A process according to claim 15 wherein the catalyst is at a temperature of from 175° C. to 450° C.

17. The process of preparing an unsaturated ketone which comprises passing an olefinic hydrocarbon and oxygen over a catalyst selected from the group consisting of metal selenites and metal tellurites.

18. The process of claim 17 wherein the catalyst is promoted by a metal oxide.

19. The process of preparing an unsaturated ketone which comprises passing an olefinic hydrocarbon and gases containing molecular oxygen over a catalyst selected from the group consisting of metal selenites and metal tellurites.

20. The process of claim 19 wherein the catalyst is promoted by a metal oxide.

21. The process of preparing an unsaturated ketone which comprises passing an olefinic hydrocarbon and air over a catalyst selected from the group consisting of metal selenites and tellurites.

22. The process of claim 21 wherein the catalyst is promoted by a metal oxide.

23. The process of preparing an unsaturated ketone which comprises passing an olefinic hydrocarbon and gases containing molecular oxygen over a silver selenite catalyst.

24. The process of claim 23 wherein the catalyst is promoted by cupric oxide.

25. The process for preparing methyl vinyl ketone which comprises reacting butene-1 and air in the presence of a silver selenite catalyst.

26. The process of claim 25 wherein the silver selenite catalyst is promoted by copper oxide.

27. The process of preparing an unsaturated ketone which comprises passing an olefinic hydrocarbon and air together with nitrogen oxides over a metal selenite catalyst.

28. The process of preparing an unsaturated ketone which comprises mixing an olefinic hydrocarbon with excess air in a ratio of from 90/10 to 98/2 and passing the mixture over a catalyst selected from the group consisting of metal selenites and metal tellurites.

29. A process according to claim 28 wherein the catalyst is at a temperature of from 175° C. to 450° C.

ALFRED CLARK.
RICHARD S. SHUTT.